US010000945B2

(12) United States Patent
Frantz

(10) Patent No.: US 10,000,945 B2
(45) Date of Patent: Jun. 19, 2018

(54) UNIVERSAL ELECTRONICS LOCK

(71) Applicant: Donald R. Frantz, New Berlin, WI (US)

(72) Inventor: Donald R. Frantz, New Berlin, WI (US)

( * ) Notice: Subject to any disclaimer, the term of this patent is extended or adjusted under 35 U.S.C. 154(b) by 0 days. days.

(21) Appl. No.: 15/808,668

(22) Filed: Nov. 9, 2017

(65) Prior Publication Data

US 2018/0051490 A1   Feb. 22, 2018

Related U.S. Application Data

(63) Continuation-in-part of application No. 12/670,279, filed as application No. PCT/US2007/082215 on Oct. 23, 2007, now abandoned.

(60) Provisional application No. 60/951,340, filed on Jul. 23, 2007.

(51) Int. Cl.
| *E05B 73/00* | (2006.01) |
| *F16B 41/00* | (2006.01) |
| *E05B 17/14* | (2006.01) |

(52) U.S. Cl.
CPC ............ *E05B 73/00* (2013.01); *E05B 17/142* (2013.01); *F16B 41/005* (2013.01); *E05B 73/007* (2013.01)

(58) Field of Classification Search
CPC ........ F16B 41/005; F16B 37/14; F16B 39/00; E05B 73/00; E05B 17/142; E05B 73/007; E05B 73/0082; Y10T 70/5867
USPC ............. 70/57, 58, 140, 158, 163, 166–173, 70/229–232, 259, 260, DIG. 57; 248/551–553; 292/251; 411/372.5, 411/372.6, 373, 910
See application file for complete search history.

(56) References Cited

U.S. PATENT DOCUMENTS

| 742,562 | A | * | 10/1903 | Becraft | |
| 1,430,707 | A | * | 10/1922 | Weaver | B62D 43/007 224/42.25 |
| 1,430,837 | A | | 10/1922 | Oakes | |
| 1,447,564 | A | * | 3/1923 | Norlund | F16B 23/0061 411/337 |
| 1,486,448 | A | * | 3/1924 | Norlund | F16B 37/00 411/368 |
| 1,603,218 | A | * | 10/1926 | Smith | B60B 23/04 301/11.2 |
| 1,625,901 | A | | 4/1927 | Lay | |

(Continued)

FOREIGN PATENT DOCUMENTS

WO     2009014547     1/2009

*Primary Examiner* — Lloyd A Gall
(74) *Attorney, Agent, or Firm* — Joseph S. Heino; James E. Lowe, Jr.; Erin E. Kaprelian

(57) ABSTRACT

A universal electronics lock and lock kit has an inner cylinder and an outer cylinder. The outer cylinder slidingly fits over the inner cylinder. The outer cylinder is equipped with a lock cylinder that has an movable latch. When the latch is in one position, it clears an inwardly-directed ridge defined within the inner cylinder. The lock is then in the "unlocked" position. When the latch is in a second position when rotated by a turning of a key, the latch is disposed behind a portion of the ridge and the lock is in the "locked" position. The universal electronics lock of the present invention allows rotation of the cylinders about a fastener, thus making the lock difficult to cut or saw through. In the lock kit, a plurality of fasteners and spacers are provided to adjust for use with electronics from different manufacturers.

9 Claims, 5 Drawing Sheets

(56) References Cited

U.S. PATENT DOCUMENTS

| | | | | |
|---|---|---|---|---|
| 1,656,253 A * | 1/1928 | Weaver | ............... | B62D 43/007 224/42.25 |
| 1,685,924 A * | 10/1928 | Lee | ............... | B60B 23/00 70/178 |
| 1,741,593 A * | 12/1929 | Trautner | ............... | F16B 41/005 224/42.25 |
| 1,751,629 A * | 3/1930 | Harrington | ............... | F16B 41/005 224/42.25 |
| 1,851,141 A * | 3/1932 | Thorp | ............... | F16B 41/005 70/168 |
| 1,853,162 A * | 4/1932 | Jacobi | ............... | B60R 25/00 411/402 |
| 1,854,488 A * | 4/1932 | Root | ............... | B62D 43/007 70/19 |
| 1,900,146 A | 3/1933 | Winkler | | |
| 1,912,872 A * | 6/1933 | Trautner | ............... | B60R 25/00 70/231 |
| 1,991,181 A | 2/1935 | Smith | | |
| 2,043,872 A * | 6/1936 | Wise | ............... | F16B 41/005 70/232 |
| 2,322,347 A | 6/1943 | Churchman | | |
| 2,323,058 A * | 6/1943 | Lambert-Carez | ..... | F16B 41/005 220/210 |
| 2,345,949 A * | 4/1944 | Robbins | ............... | F16B 41/005 70/232 |
| 2,352,967 A * | 7/1944 | Noble | ............... | F16B 41/005 220/288 |
| 2,469,973 A * | 5/1949 | Malluk | ............... | F16B 41/007 70/232 |
| 2,535,126 A * | 12/1950 | Flowers | ............... | B60B 7/16 301/37.21 |
| 3,060,785 A * | 10/1962 | Corlett | ............... | B25B 13/485 411/548 |
| 3,181,523 A | 5/1965 | Casey | | |
| 3,540,245 A | 11/1970 | Pope | | |
| 3,605,460 A | 9/1971 | Singer et al. | | |
| 3,707,860 A | 1/1973 | Singer et al. | | |
| 3,732,033 A * | 5/1973 | Macchi | ............... | B63H 1/20 403/317 |
| 3,740,981 A * | 6/1973 | Patriquin | ............... | F16B 37/14 439/142 |
| 3,744,282 A * | 7/1973 | Hemphill | ............ | E05B 73/0082 70/232 |
| 3,748,879 A * | 7/1973 | Singer | ............... | F16B 41/005 70/232 |
| 3,782,146 A * | 1/1974 | Franke | ............... | E05B 73/00 166/85.1 |
| 3,817,065 A | 6/1974 | Sander | | |
| 3,859,826 A | 1/1975 | Singer et al. | | |
| 3,910,079 A | 10/1975 | Gassaway | | |
| 3,978,698 A | 9/1976 | Ono | | |
| 3,981,617 A * | 9/1976 | Milewicz | ............ | E05B 73/0076 416/134 R |
| 4,065,946 A | 1/1978 | Loynes et al. | | |
| 4,093,285 A | 6/1978 | Fayle | | |
| 4,214,505 A * | 7/1980 | Aimar | ............... | F16B 5/126 24/350 |
| 4,406,140 A * | 9/1983 | Wolter | ............... | F16B 41/005 70/231 |
| 4,444,031 A | 4/1984 | Watson | | |
| 4,502,825 A | 3/1985 | Yamada | | |
| 4,574,602 A | 3/1986 | Furuse | | |
| 4,656,848 A | 4/1987 | Rose | | |
| 4,683,735 A * | 8/1987 | Magrobi | ............ | B60K 15/0409 180/287 |
| 4,710,082 A | 12/1987 | Curtis | | |
| 4,779,433 A | 10/1988 | Legare | | |
| 4,856,305 A | 8/1989 | Adams | | |
| 4,856,307 A * | 8/1989 | Hauser | ............... | F16B 41/005 70/165 |
| 4,870,842 A | 10/1989 | Plumer | | |
| 4,884,422 A | 12/1989 | Wolter | | |
| 5,007,260 A | 4/1991 | Sharp | | |
| 5,063,763 A | 11/1991 | Johnson | | |
| 5,076,079 A | 12/1991 | Monoson et al. | | |
| 5,097,686 A | 3/1992 | Plumer | | |
| 5,184,798 A | 2/1993 | Wilson | | |
| 5,433,094 A | 7/1995 | Sandin et al. | | |
| 5,469,726 A | 11/1995 | Rushing et al. | | |
| 5,649,437 A | 7/1997 | Royka, Jr. et al. | | |
| 5,806,354 A | 9/1998 | Hasnik | | |
| 5,839,303 A | 11/1998 | Umberg et al. | | |
| 5,884,510 A * | 3/1999 | Crocco | ............... | E05B 17/142 70/169 |
| 6,308,997 B1 * | 10/2001 | Haseley | ............... | E05B 35/008 292/307 R |
| 6,428,061 B1 | 8/2002 | Daoud | | |
| 6,494,658 B1 * | 12/2002 | Roy | ............... | F16B 33/008 411/372.5 |
| 6,726,515 B1 * | 4/2004 | DeMange | ............ | F16B 41/005 440/113 |
| 7,243,514 B2 | 7/2007 | Frantz | | |
| 7,392,674 B1 | 7/2008 | Grote | | |
| 7,409,843 B1 | 8/2008 | Rinehart | | |
| 7,673,482 B2 * | 3/2010 | Bosman | ............... | B60B 7/16 301/35.624 |
| 8,596,101 B2 * | 12/2013 | Beaudoin | ............ | B60K 15/0409 215/207 |
| 8,733,140 B2 * | 5/2014 | Jones | ............... | B60B 7/16 188/32 |
| 2008/0264118 A1 | 10/2008 | King | | |
| 2010/0186465 A1 | 7/2010 | Frantz | | |

\* cited by examiner

UNIVERSAL ELECTRONICS LOCK

This application is a continuation-in-part of U.S. patent application Ser. No. 12/670,279 filed Jan. 22, 2010, which is the National Stage Entry into the United States Patent and Trademark Office from International PCT Application No. PCT/US07/82215, having an international filing date of Oct. 23, 2007, and which claims the priority and benefit of U.S. Provisional Patent Application Ser. No. 60/951,340 filed Jul. 23, 2007, each of which is incorporated herein by reference in its entirety.

FIELD OF THE INVENTION

The present invention relates generally to locks and other security devices. More specifically, it relates to a universal lock that is used to secure an electronic device or instrument to a bracket by replacing or supplementing a threaded mounting portion of the electronic device or instrument, or of the bracket, with the universal lock. Further, the present invention relates to a kit that contains a number of complementary parts provided at the time of purchase to allow the user to adapt the universal lock to a wide variety of electronic devices and instruments.

BACKGROUND OF THE INVENTION

There are many types of electronic instruments, such as marine sonar devices, global positioning devices ("GPS"), among others, that are designed to be installed onto a mounting bracket using one or more fasteners that are provided by the manufacturer (or original equipment manufacturer or "OEM"), or preinstalled by the OEM. Such devices will be alternatively referred to herein as "electronic devices," "electronics" or "instruments." The instruments are typically configured with threaded holes disposed in opposing sides of the body of the instrument, such holes being axially aligned with holes defined in the supporting bracket. The fasteners are threaded such that the threads complement those of the threaded holes in the instrument. This mounting configuration permits some vertical adjustability as well as angular adjustability of the instrument, which enhances the visibility of the instrument by the user. By tightening the fastener or fasteners, the user can secure both the vertical position of the instrument and its angle of tilt.

In this inventor's experience, boaters prefer electronic instruments such as sonar to be raised off the console so they are more readily visible from a standing position, such as when the driver of the boat is standing at the wheel for better visibility. The valuable nature of GPS units and marine sonar units also makes them an easy potential target for thieves. To both ends, this inventor devised an electronics lock device that is disclosed and claimed in U.S. Pat. No. 7,243,514 entitled Method and Device for Securing an Electronic Instrument to a Bracket. While the device of that application is fully functional and has achieved much commercial success, this inventor is aware of the fact that the device disclosed and claimed in that application is not applied "universally" to all or most commercially available instruments and their associated bracketry. That is, all or most types of electronics and bracketry that exist in the marketplace do not use the same fasteners, there being no requirement for such.

Accordingly, this inventor has sought to devise another lock device that is universally applicable to all or most types of electronics and bracketry that exist in the marketplace, including electronics used with marine craft and land vehicles, such as trucks and automobiles, for example.

SUMMARY OF THE INVENTION

What is needed is a universal electronics lock that can be used to securely and inexpensively lock electronic devices or instruments to brackets. The present invention provides such a device that, when used properly, helps to prevent theft of sonar devices and GPS units from the brackets they are normally installed on or mounted to. The present invention also provides the device as part of a kit which allows for "universal" use of the device with associated elements that form the kit.

The universal electronics lock (alternatively, "lock" or "lock device") of the present invention provides for a unique locking structure having a substantially hollow inner cylinder and a substantially hollow outer cylinder that complements the inner cylinder. The outer cylinder slidingly fits over, and effectively overlaps, all but a very short portion of the inner cylinder. The outer cylinder is equipped with a locking mechanism that has a latch disposed within it. When the latch is in one position, it can be inserted into the inner cylinder where it clears an inwardly-directed circumferential ridge that is disposed inwardly of the inner cylinder. The lock is then in the "unlocked" position. When the locking device is rotated by a turning of a key in the lock, a "catch" portion of the latch is disposed behind the ridge and the lock is in the "locked" position. In order to attach the lock, and specifically the inner cylinder thereof, the user has to insert a fastener into the inner cylinder, with or without washer-like spacers, through a hole in the instrument bracket and then into the instrument. Alternatively, to access the fastener, the user must first unlock and remove the lock, together with the outer cylinder of the lock, which then allows the user to "back out" the threaded fastener from the electronics device.

In the lock device of the present invention, a kit is provided with a plurality of fasteners, at least one of which is of sufficient length and has a thread that matches the thread of the aperture of the instrument. One idea behind the universal electronics lock of the present invention is that it allows rotation about the fastener, thus making the lock difficult to cut or saw through because there is little if any gap between the lock and the bracket. Another idea is that the inner cylinder is provided with a thickened portion, again making the lock difficult to cut or saw through. Yet another idea is that the addition of one or more spacers under the head of the fastener enhance rotation of the device, likewise frustrating illicit removal of the device. Yet another idea is that the provision of multiple fasteners with the lock as a kit ensures that the user will be provided with a fastener that complements use of the lock with the instrument. The foregoing and other features of the universal electronics lock of the present invention will be apparent from the detailed description that follows.

DETAILED DESCRIPTION OF THE INVENTION

Figure 1:
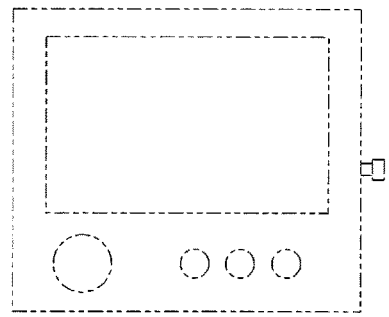
FIG. 1 is a front elevational view of an electronics mounting bracket that has the electronic device attached to it using a preferred embodiment of a universal electronics lock constructed in accordance with the present invention; however, the view of the universal electronics lock itself being a right side view of the lock.
Figure 1:
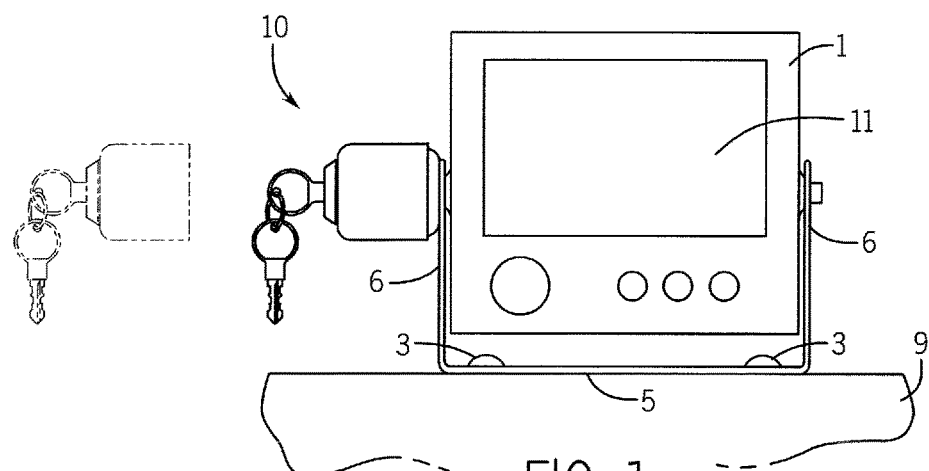

Referring now to the drawings in detail, wherein like numbered elements correspond to like elements throughout, FIG. 1 is a front elevational view of a universal electronics lock, generally identified 10, constructed in accordance with the present invention. As shown in FIG. 1, the lock 10 is used to secure an electronics device 1 to a support structure, which support structure typically comprises a generally U-shaped structure comprising a bracket 5. The bracket 5 of the preferred embodiment comprises a pair of opposing side legs 6 such that the electronics device 1 can be tilted at different angles to facilitate the user's ability to visualize the display 11 of the electronics device 1 from a number of positions. The bracket 5 is, in turn, secured to a surface 9 by means of one or more fasteners 3. It is to be understood that the universal electronics lock 10 of the present invention is not limited to use with this type of electronics device 1, the type of device 1 not being a limitation of the present invention.

Figure 2:
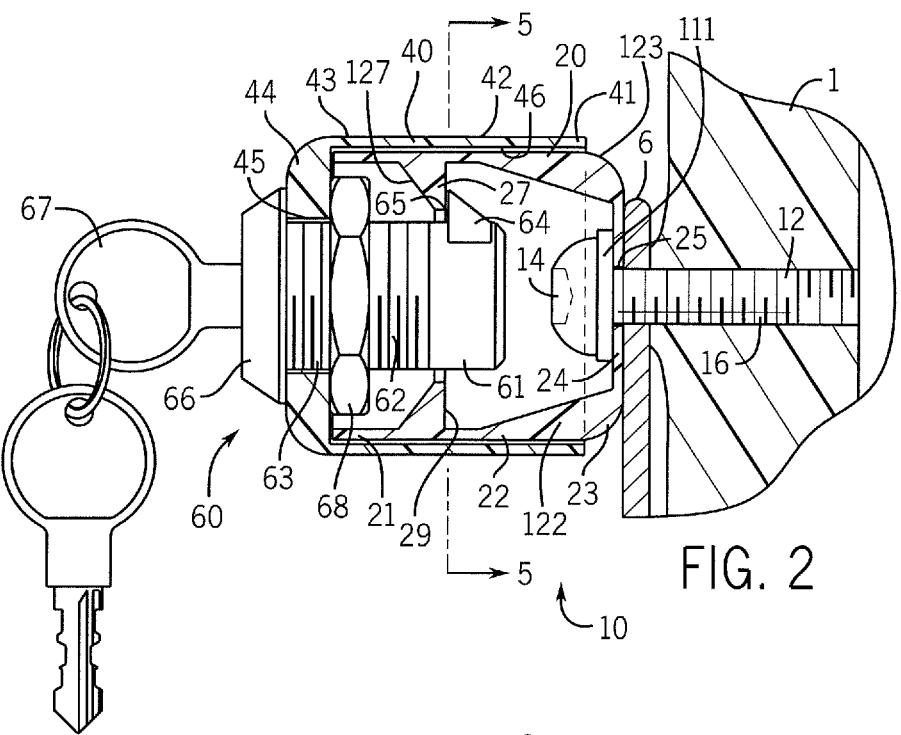
FIG. 2 is an enlarged right side elevational and partially cross-sectioned view of the universal electronics lock illustrated in FIG. 1 and showing the lock in the "locked" position.

As shown in FIG. 2, it will be understood that the universal electronics lock 10 of the present invention comprises five essential components and one optional component depending on the particular application. The first component is a substantially hollow and cup-shaped inner cylinder, generally identified 20. The second component is a substantially hollow and cup-shaped outer cylinder, generally identified 40. The outer cylinder 40 is functionally adapted and configured to slide over a substantial portion of the inner cylinder 20 and, in this fashion, overlap a substantial portion of the inner cylinder 20. As used herein, "substantial" means overlap of the entire inner cylinder 20 except for a small rounded shoulder 23 of the inner cylinder 20. The third component is a means for securing the outer cylinder 40 to the inner cylinder 20, the inner and outer cylinder securing means in the preferred embodiment comprising a lock cylinder assembly, generally identified 60. Lastly, the fourth component is a means for securing the inner cylinder 20 to the electronics device 1, thereby sandwiching a part of the support structure (such as the bracket 5) between the inner cylinder 20 and the electronics device 1, the electronics securing structure comprising a fastener 12, or a "kit fastener" 112, as will be discussed in more detail later in this disclosure. A fifth optional, but potentially essential, component is a spacer 30 which may be inserted into the inner cylinder 20. The spacer 30 (which can comprise more than one spacer, again depending on the application) comprises a washer-like structure having an aperture 113 which allows the fastener 12, 112 to pass through the spacer 111, the purpose of which will also be apparent later in this detailed disclosure.

Figure 3:
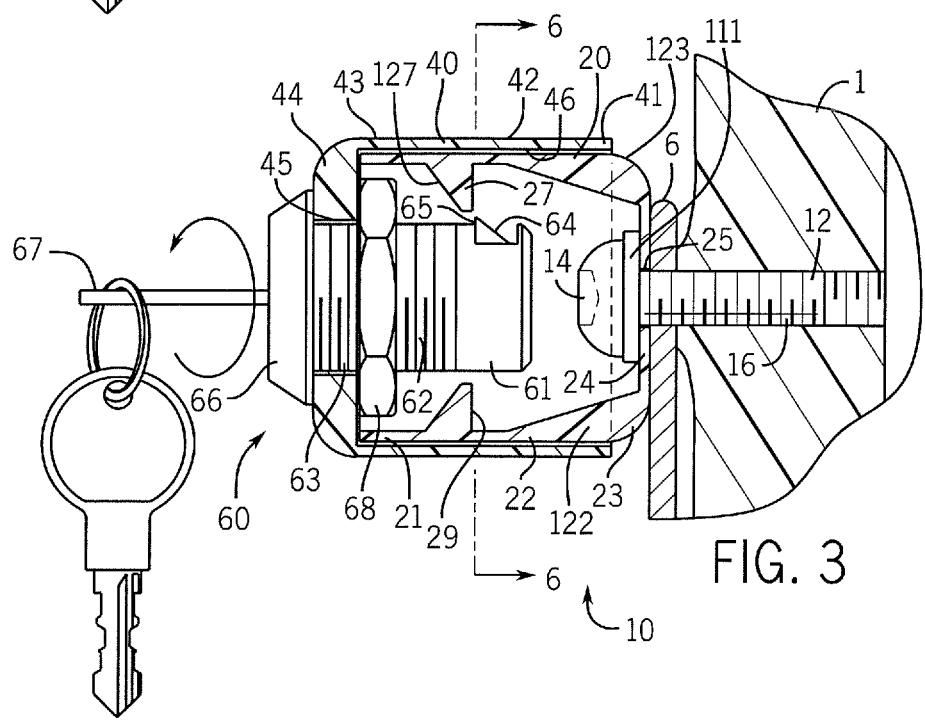
FIG. 3 is a view similar to that illustrated in FIG. 2 and showing the universal electronics lock in the "unlocked" position.

The inner cylinder 20 is a substantially hollow member comprising a cylindrically-shaped and continuous side wall 22, the inner cylinder 20 comprising an outer diameter. The cylindrical-shaped side wall 22 comprises an outer surface 26. The side wall 22 further comprises a first end 21 and a second end 23. The first end 21 comprises a circular opening 28. Moving inwardly of this opening 28 is a circumferential ridge 27 that is disposed medially within the inner cylinder 20 and then the inner surface of the second end 23. The side wall 22 is uniform in thickness between the opening 28 and the medially-disposed circumferential ridge 27, the ridge 27 being tapered inwardly to a medial point within the cylinder 20 so as to provide strength to a flat shoulder 29 of the ridge 27 together with support for any structure that may rest on the face of the flat shoulder 29. The flat shoulder 29 itself projects substantially transversely inwardly from the side wall 22. Inside of, or just past, the ridge 27 and shoulder 29, the side wall 22 thickens in an inwardly tapered fashion moving away from the ridge 27 and toward the second end 23. This inwardly tapered thickened portion 122 is shown in FIGS. 2 and 3, for example. Put another way, the inner diameter of the inner cylinder 20 grows smaller moving away from the shoulder 29 and toward the second end 23 of the cylinder 20. This configuration provides additional strength to the side wall 22 and its thickened portion 122 which is intended to frustrate efforts to remove the inner cylinder 20 (and, in turn, the outer cylinder 40) by attempting to cut into the exposed small rounded, but thickened, shoulder portion 123 of the second end 23 of the inner cylinder 20, as shown in FIGS. 1-4 and 7. The side wall second end 23 and shoulder portion 123 transition into an end wall 24 that is integrally formed with the side wall 22 of the inner cylinder 20. At this second end 23, the transition results in the creation of the small rounded shoulder structure 123, which, again, is intended to impede attempts to cut into the inner cylinder 20 as any cutting instrument would tend to slide off of the rounded shoulder 123 of the second end 23. That is a function of the rounded shoulder 123 of the second end 23, together with the fact that, when installed, the inner cylinder 20 rotates about the fastener 12, as does the outer cylinder 40 relative to both the inner cylinder 20 and the fastener 12. Thus, any attempt to saw through the rounded shoulder 123 of the inner cylinder 20 would be most difficult because a substantial amount of material (the thickened portion 122) is disposed at this second end 23 and because the cylinder 20 would rotate with the cutting blade or instrument. Attempts to cut the shoulder 123 using a knife or other instrument are met by the same difficulty. Further, the end wall 24 of the second end 23 of the inner cylinder 20 has a thickness that is slightly greater than the thickness of that portion of the inner cylinder side wall 21 that is disposed between the first end 22 of the inner cylinder 20 and the ramped portion 127 of the ridge 27. Lastly, the end wall 24 also includes a centrally-disposed aperture 25. The purpose of the aperture 25 will be apparent later in this detailed description.

As alluded to above, formed within the side wall 22 of the inner cylinder 20 is a circumferential ridge 27, the ridge 27 being formed from a portion of the side wall 22 and extending inwardly of the inner cylinder 20. It is to be understood, however, that the ridge 27 of the inner cylinder 20 could also be formed as an element that is manufactured separately and apart from the side wall 22 of the inner cylinder 20. For example, the ridge 27 could be formed into another cylinder (not shown) and that other cylinder could, in turn, be press-fit into the inner cylinder 20. However, forming the ridge 27 as described above is a design expediency that requires fewer parts and fewer steps in the manufacturing process to create in the view of this inventor. The innermost portion of the ridge 27 forms a circumferential flat shoulder 29. The purpose of the ridge 27 and shoulder 29 will also be apparent later in this detailed description. Finally, the inner cylinder 20 of the universal lock 10 can be fabricated of a plastic material in the preferred embodiment, but is not so limited. The inner cylinder 20 could, for example, be fabricated of a metal material, from a combination of metal and plastic components, or from carbon fiber impregnated nylon or plastic.

The outer cylinder 40 of the universal electronics lock 10 is a substantially hollow member similarly comprising a cylindrically-shaped and continuous side wall 42. The cylindrically-shaped side wall 42 of the outer cylinder 40 comprises an inner surface 46 having an inner diameter. In the preferred embodiment, the inner diameter of the inner surface 46 of the side wall 42 is only slightly greater than the diameter of the outer surface 26 of the inner cylinder 20. In this configuration, the two cylinders 20, 40 can closely overlap or "nest" in a way whereby the inner cylinder 20 is slidably receivable within a substantial portion of the outer cylinder 40, leaving only the small shoulder portion 123 of the second end 23 exposed when the two cylinders 20, 40 are fully engaged, as is shown in FIGS. 1, 2 and 3. This is the shoulder structure 123 as was referenced above. The side wall 42 of the outer cylinder 40 further comprises a first end 41 and a second end 43. The first end 41 of the side wall 42 forms a circular opening 48 for receiving the first end 21 of the inner cylinder 20. The second end 43 transitions into an end wall 44 that is integrally formed with the side wall 42 of the outer cylinder 40. Between the first and second ends 41, 43, respectively, the thickness of the side wall 42 is uniform. The end wall 44, however, comprises a thickened portion that is also formed as a rounded shoulder and supporting wall and also includes a centrally-disposed aperture 45. This particular aperture 45 is formed to receive a portion of the lock cylinder assembly 60 within it. The thickened end wall 44 provides structural support to the outer cylinder 40 at the point where the lock cylinder assembly 60 is secured to that end wall 44. In the preferred embodiment, the outer cylinder 40 is fabricated of a plastic or metal material and is variably fabricated as stated above with respect to the inner cylinder 20.

The slam lock cylinder assembly 60 comprises a lock cylinder body 62 having a first end 61 and a second end 63. A spring-loaded and transversely-movable, or outwardly-movable (relative to the central axis of the lock cylinder body 62), latch 64 is incorporated into the first end 61 of the lock cylinder body 62. As shown in FIG. 1, the latch 64 includes a shoulder 65. The second end 63 of the lock cylinder body 62 is threaded so as to be mountable to the end wall 44 of the outer cylinder 40 by means of a ring nut 68. The second end 63 of the lock cylinder body 62 also includes a flanged portion 66. In the universal lock 10 of the present invention, the flanged portion 66 of the lock cylinder body 62 is disposed at the outer surface of the end wall 44 of the outer cylinder 40, the remainder of the lock cylinder body 62 extending through the aperture 45 of the end wall 44. In this fashion, the ring nut 68 and the latch 64 may be secured to the lock cylinder body 62 to secure the lock cylinder 60 to the outer cylinder 40. In the preferred embodiment of this universal electronics lock 10, the lock cylinder 60 is comprised of a metal material. It is to be understood that alternative configurations of the lock cylinder assembly 60 could be used, as long as such assembly 60 included a transversely movable latch 64 and latch shoulder 65.

Figure 5:
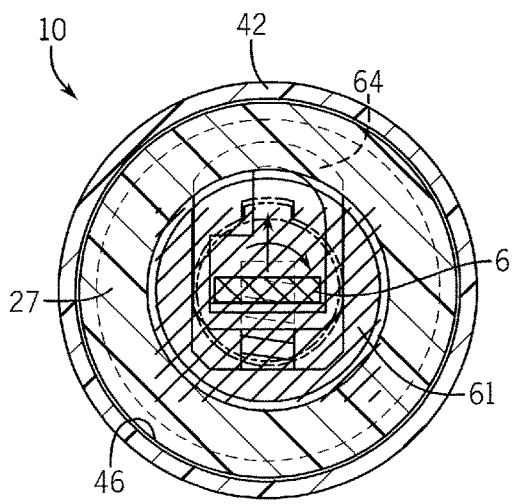
FIG. 5 is a front elevational and cross-sectioned view of the universal electronics lock shown in the locked position and taken along line 5-5 of FIG. 2.
Figure 6:
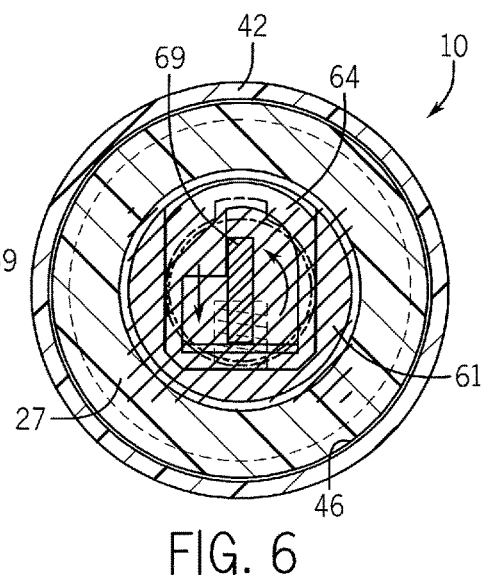
FIG. 6 is a view similar to that illustrated in FIG. 5 but showing the universal electronics lock in the unlocked position and taken along line 6-6 of FIG. 3.
Figure 4:
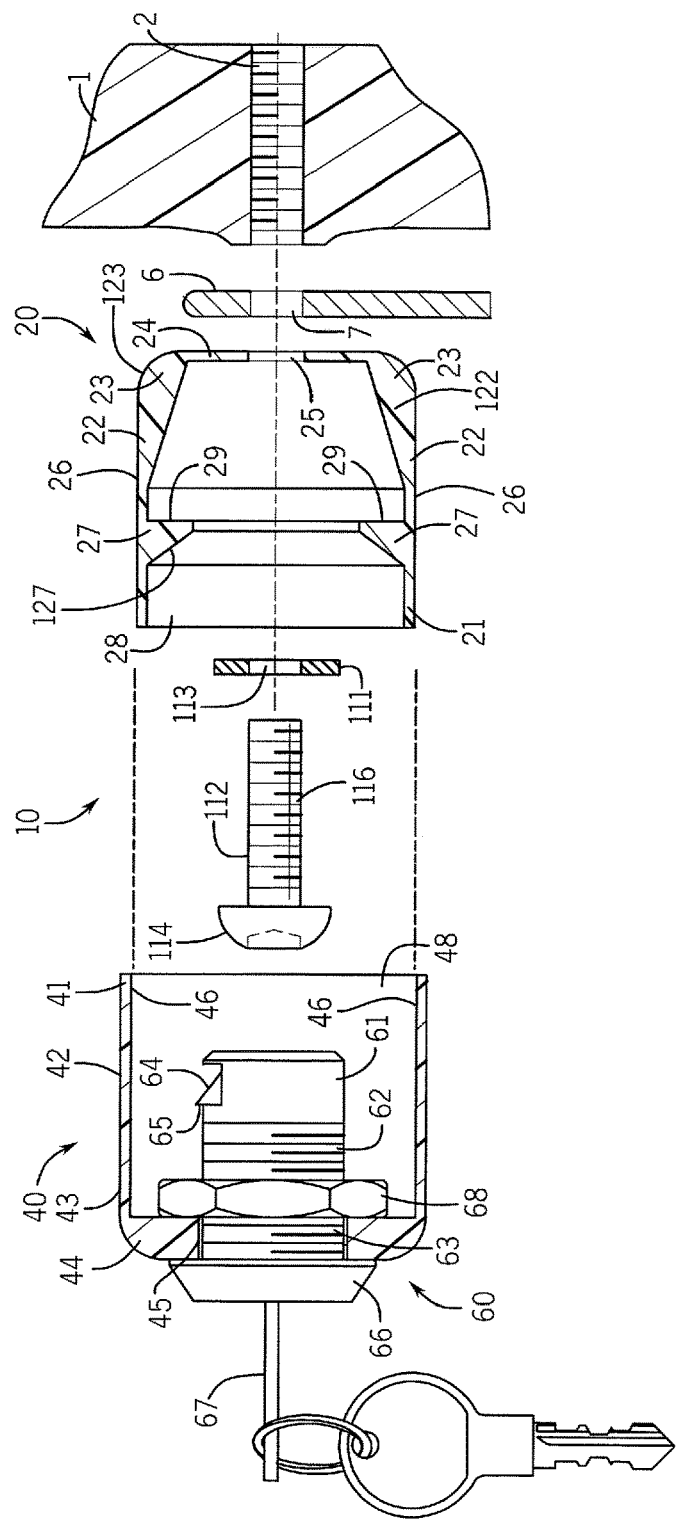
FIG. 4 is an exploded right side elevational and partially cross-sectioned view of the universal electronics lock illustrated in FIGS. 1-3.
Figure 7:
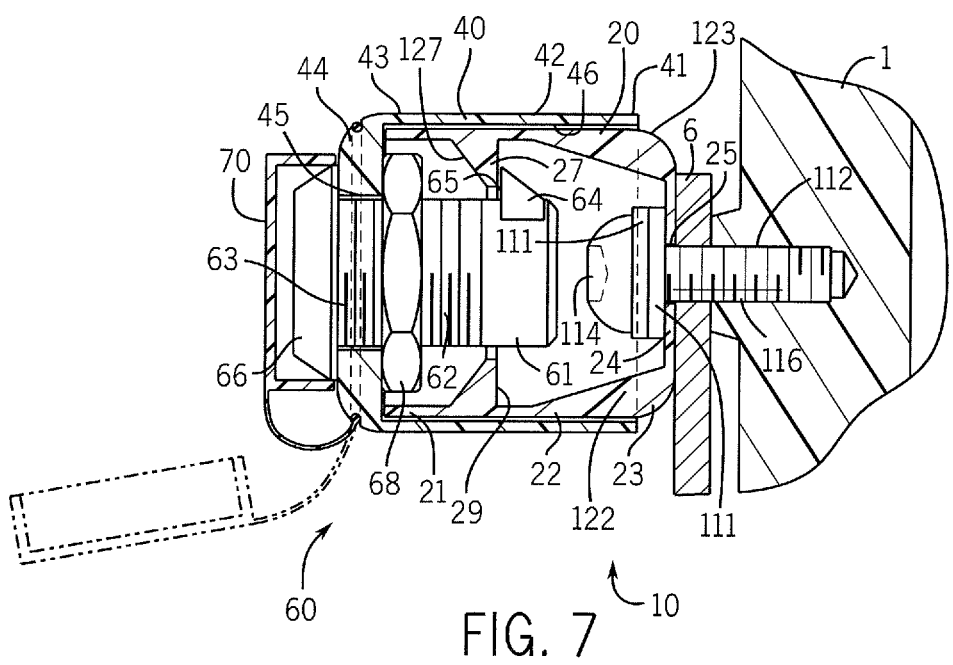
FIG. 7 is a view similar to that illustrated in FIG. 2 and showing the electronics lock being secured via a bolt together with a plurality of spacers disposed along the bolt and below the bolt head and further showing a debris cover for use over a portion of the lock cylinder assembly.

The lock cylinder 60 is operated by turning a key 67 in the lock cylinder 62 in one direction, wherein the latch 64 of the lock cylinder 60 is extended outwardly (as shown in FIGS. 2 and 5) to engage the ridge 27 of the inner cylinder 20. This corresponds to the "locked" position of the universal electronics lock 10. In the "locked" position, the shoulder 65 of the latch 64 is adjacent the shoulder 29 of the ridge 27, thereby engaging the inner and outer cylinders 20, 40. When the key 67 is rotated, latch 64 is withdrawn into the lock cylinder 60 and the opposite is true. That is, this corresponds to the "unlocked" position of the universal electronics lock 10 (as shown in FIGS. 3, 4 and 6). It is also to be noted by closely examining FIGS. 5 and 6 that a rotatable tab 69 is used within the lock cylinder assembly 60 to move the latch 64 and latch shoulder 65 into (FIG. 5) and out of (FIG. 6) engagement with the ridge 27 and ridge shoulder 29. In short, the latch shoulder 65 moves inwardly toward the lock cylinder body 62 when the lock 10 is in the "unlocked" position and outwardly from the lock cylinder body 62 when the lock 10 is in the "locked" position.

Viewed another way, the latch 64 is engaged with the flat shoulder 29 of the inner cylinder ridge 27 via the key 67 when the lock cylinder 60 is fully inserted into the inner cylinder 20 and the key 67 is rotated to move the latch 64 to the "locked" position. Alternatively, the latch 64 can be in the "locked" position prior to full insertion of the lock cylinder 60 (via the outer cylinder 40) into the inner cylinder 20 and, as the lock cylinder 60 is inserted into the inner cylinder 20, the latch 64 is urged over the ramped portion 127 of the ridge 27 which moves the latch 64 into the lock cylinder 60 to the point that it engages the flat shoulder 29 of the inner cylinder ridge 27 and the latch 64 moves outwardly from the lock cylinder 60.

The lock cylinder 60 may also include a debris cover, generally identified 70. Regarding the debris cover 70, it is to be understood that it may be anchored via an expansible ring about the first end 41 of the outer cylinder 40 or about a lip (not shown) that could formed into the flanged portion 66 of the second end 63 of the lock cylinder body 62.

Figure 8:
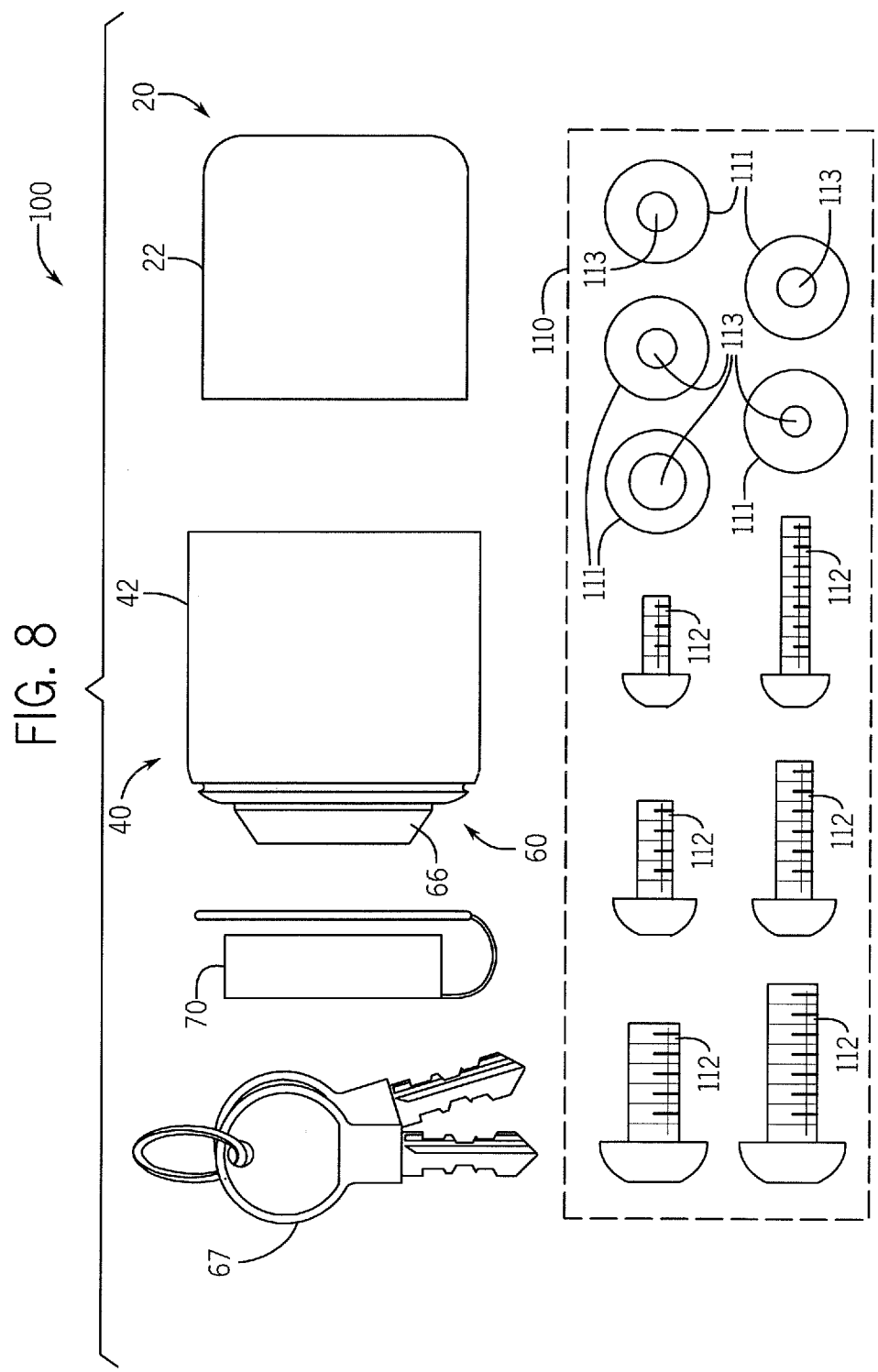
FIG. 8 is an exploded front and top perspective view of the universal electronics lock kit that is provided in accordance with the present invention, which kit provides a plurality of kit fasteners and kit spacers contained in a sealed bag.

In application, the user would remove the fastener provided by the OEM (which could be element numbered 12) that would be used to attach the electronic device 1 to one upright leg 6 of the bracket 5, the bracket 6 having an aperture 7 defined in it and the electronic device 1 having an aperture 2 defined in it. See FIG. 4. Such attachment would also be similar to that shown in U.S. Pat. No. 7,243,514, for example. In the present invention, however, it is intended that the OEM fastener is replaced by a fastener 112 that comes with a kit, generally identified 100. That is, the lock 10 is provided as part of a kit, generally identified 100. See FIG. 8. In the kit 100 is the combined inner and outer cylinders 20, 40, respectively, the lock cylinder 60 and its keys 67. The kit 100 further comprises a sealed transparent bag 110 containing a plurality of spacers 111 and a plurality of fasteners 112, each referred to as a "kit fastener." The spacers 111 are intended to be placed inside the inner cylinder 20 and beneath the head 14 of the fastener 12 such that the spacers 112 are captured between those two structures.

In the preferred embodiment of the kit 100, the plurality of spacers 111 comprises washer-like spacers 111 having the same outer diameter but different inner diameters to accommodate the variety of kit fasteners 112 that are provided. Also in the preferred embodiment, six different sizes of screws or bolts are provided, which allows at least one of the screws or bolts to match the threading of the OEM electronics device. If the kit fastener 112 is too long for the aperture 2 of the electronics device 1, then a plurality of spacers 111 can be used to prevent the kit fastener 112 from "bottoming out" in the aperture 2 of the instrument 1. The selection of screws or bolts ranges from 0.625 inch (16 mm) to 1.15 inch (30 mm) and protect most major brands of bracket mounted marine electronics, including Lowrance® (Lowrance is a registered mark of Navico Holding AS), Humminbird® (Humminbird is a registered mark of Johnson Outdoors Marine Electronics, Inc.), Garmin® (Garmin is a registered mark of Garmin Corporation), Raymarine® (Raymarine is a registered mark of Flir Belgium BVBA), Cobra® (Cobra is a registered mark of Cobra Electronics Corporation), Eagle® (Eagle is a registered mark of Navico, Inc.), Icom® (Icom is a registered mark of Icom Incorporated), Standard Horizon® (Standard Horizon is a registered mark of Yaesu USA, Inc.), Uniden® (Uniden is a registered mark of Uniden Financial Inc.) and others.

Following removal of the OEM fastener, the user would then insert the threaded portion 16 of a kit fastener 112 through the aperture 25 of the inner cylinder 20 such that the head 14 of the kit fastener 112 is disposed to the interior of the inner cylinder 20. The user would then insert the threaded portion 16 of the fastener 112 through the aperture 7 of the bracket leg 6 and into the aperture 2 of the electronic device 1. See FIG. 4. The outer cylinder 40 is then slid over the outer surface 26 of the inner cylinder 20. When the outer cylinder 40 is fully engaged with the inner cylinder 20, the key 67 can be rotated thereby releasing the latch 64 into locking position with the ridge 27 of the inner cylinder 20 as shown in FIG. 2. Significant in this invention is that the outer cylinder 40 can be presented to the inner cylinder 20 in virtually any position where the outer cylinder 40 overlaps the inner cylinder 20 and the latch 64 will always be in a position to "catch" a portion of the ridge 27 of the inner cylinder 20 in any position. That is, the latch shoulder 65 can overlay the ridge 27 and ridge shoulder 29 within 360° of rotation of the latch 64. In this position, the kit fastener 112 is rendered inaccessible by the overlapped and secured inner and outer cylinders 20, 40, respectively. Thus, it will be appreciated that the universal electronics lock 10 of the present invention allows rotation about the kit fastener 112, thus making the lock 10 difficult to cut or saw through. To unlock the universal electronics lock 10, the opposite of these steps would be done.

Alternatively, the lock 10 could use the OEM fastener if the length of the fastener allows proper securement of the lock 10 to the instrument 1.

What is claimed is:

1. A universal electronics lock for securing an electronics device to a bracket, the electronics device having a threaded aperture in it and the bracket having a complementary aperture, the lock comprising:
   a substantially hollow inner cylinder comprising:
      a first end comprising an opening;
      a second end comprising an end wall, the end wall having an aperture defined in it;
      a continuous side wall that extends between the first end and the second end, the side wall comprising an outer diameter;
      a circumferential ridge disposed medially within the inner cylinder and extending inwardly from the side wall of the inner cylinder, the ridge comprising a ramped portion, the ramped portion facing the first end of the inner cylinder and commencing at a point along the inner cylinder side wall and terminating substantially at an axially innermost portion of the ridge, and a flat shoulder, the flat shoulder projecting substantially transversely from a point along the inner cylinder side wall and terminating at the axially innermost portion of the ridge, the flat shoulder facing the end wall of the second end of the inner cylinder; and
      an outer circumferential rounded shoulder that transitions the side wall to the second end of the inner cylinder;
      wherein the side wall comprises a uniform thickness between the first end and the ramped portion of the ridge;
      wherein the side wall comprises a structure of tapered increased thickness between the flat shoulder of the circumferential ridge and the second end of the inner cylinder; and
      wherein the end wall of the second end of the inner cylinder has a thickness that is greater than the thickness of that portion of the inner cylinder side wall that is disposed between the first end of the inner cylinder and the ramped portion of the ridge; and
   a substantially hollow outer cylinder comprising:
      a first end comprising an opening having an inner diameter, the inner diameter of the first end opening configured to be slightly greater than the outer diameter of the first end of the inner cylinder such that the outer cylinder is configured to slidingly overlap a portion of the inner cylinder;
      a second end comprising an end wall, the end wall having an aperture defined in it; and
      a side wall that extends between the first end and the second end;
      wherein the side wall comprises a uniform thickness; and
      wherein the end wall comprises an increased thickness relative to the thickness of the side wall of the outer cylinder;
   a fastener for attaching the lock to the aperture of the electronics device via the end wall aperture of the inner cylinder; and
   a slam lock cylinder assembly configured for securement within the end wall aperture of the outer cylinder, the slam lock cylinder assembly comprising a latch that is movable between a lock position when the latch engages the ridge shoulder of the inner cylinder and an unlock position when the latch disengages the ridge shoulder of the inner cylinder;
   a key that is inserted into and rotated within the slam lock cylinder assembly;
   wherein the latch is engaged with the flat shoulder of the inner cylinder ridge via the key when the slam lock cylinder assembly is fully inserted into the inner cylinder and the key is rotated to move the latch to the lock position;
   wherein, alternatively, as the slam lock cylinder assembly is inserted into the inner cylinder, the latch is urged over the ramped portion of the ridge which moves the latch into the slam lock cylinder assembly to the point that it thereafter engages the flat shoulder of the inner cylinder ridge as the latch moves outwardly from the slam lock cylinder assembly;

wherein the inner cylinder and the outer cylinder are independently rotatable when the slam lock cylinder assembly latch is in the lock position; and wherein the outer cylinder overlaps the inner cylinder with the exception of the outer circumferential rounded shoulder of the inner cylinder.

2. The universal electronics lock of claim 1 wherein the inner cylinder and the outer cylinder are each fabricated of a plastic material.

3. The universal electronics lock of claim 1 wherein the inner cylinder, the outer cylinder and the slam lock cylinder assembly are each fabricated of a metal material.

4. The universal electronics lock of claim 1 wherein the fastener comprises a head and the lock further comprises at least one spacer disposed between the end wall of the inner cylinder and the head of the fastener.

5. The universal electronics lock of claim 1 further comprising a debris shield for the slam lock cylinder assembly.

6. A universal electronics lock kit for securing an electronics device to a bracket, the electronics device having a threaded aperture in it and the bracket having a complementary aperture, the lock kit comprising:
  a substantially hollow inner cylinder comprising:
    a first end comprising an opening having an outer diameter;
    a second end comprising an end wall, the end wall having an aperture defined in it;
    a continuous side wall that extends between the first end and the second end;
    a circumferential ridge extending inwardly of the inner cylinder, the ridge comprising a flat shoulder; and
    an outer circumferential rounded shoulder disposed between the side wall and the second end of the inner cylinder;
    wherein the side wall comprises a uniform thickness between the first end and the ridge; and
    wherein the side wall comprises a structure of increasing thickness between the circumferential ridge and the second end of the inner cylinder;
  a substantially hollow outer cylinder comprising:
    a first end comprising an opening having an inner diameter, the inner diameter of the first end opening configured to be slightly greater than the outer diameter of the first end of the inner cylinder such that the outer cylinder is configured to slidingly overlap a portion of the inner cylinder;
    a second end comprising an end wall, the end wall having an aperture defined in it; and
    a side wall that extends between the first end and the second end;
    wherein the side wall comprises a uniform thickness; and
    wherein the end wall comprises an increased thickness relative to the thickness of the side wall of the outer cylinder;
  a plurality of fasteners from which one fastener is used to attach the lock kit to the aperture of the electronics device via the end wall aperture of the inner cylinder, the one fastener comprising a head;
  a plurality of spacers from which one or more spacers are disposed between the end wall of the inner cylinder and the head of the fastener; and
  a lock cylinder assembly configured for securement within the end wall aperture of the outer cylinder, the lock cylinder assembly comprising a latch that is movable between a lock position when the latch engages the ridge shoulder of the inner cylinder and an unlock position when the latch disengages the ridge shoulder of the inner cylinder;
  wherein the inner cylinder and the outer cylinder are independently rotatable when the lock cylinder assembly latch is in the lock position; and
  wherein the outer cylinder overlaps the inner cylinder with the exception of the outer circumferential rounded shoulder of the inner cylinder.

7. The universal electronics lock kit of claim 6 wherein the inner cylinder and the outer cylinder are each fabricated of a plastic material.

8. The universal electronics lock kit of claim 6 wherein the inner cylinder, the outer cylinder and the lock cylinder assembly are each fabricated of a metal material.

9. The universal electronics lock kit of claim 6 further comprising a debris shield for the lock cylinder assembly.

* * * * *